US011176259B2

(12) United States Patent
Kim et al.

(10) Patent No.: US 11,176,259 B2
(45) Date of Patent: Nov. 16, 2021

(54) AUTHENTICATION CIRCUIT, ELECTRONIC SYSTEM INCLUDING THE SAME, AND METHOD OF FORMING NETWORK

(71) Applicant: Samsung Electronics Co., Ltd., Suwon-si (KR)

(72) Inventors: Jae Min Kim, Suwon-si (KR); Jae Won Lee, Seongnam-si (KR); Junho Huh, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 338 days.

(21) Appl. No.: 16/357,841

(22) Filed: Mar. 19, 2019

(65) Prior Publication Data
US 2020/0082101 A1    Mar. 12, 2020

(30) Foreign Application Priority Data
Sep. 12, 2018    (KR) .......................... 10-2018-0108866

(51) Int. Cl.
*G06F 21/60*    (2013.01)
*G06F 16/182*    (2019.01)
(Continued)

(52) U.S. Cl.
CPC ........ *G06F 21/602* (2013.01); *G06F 16/1824* (2019.01); *G06F 16/1834* (2019.01);
(Continued)

(58) Field of Classification Search
CPC ............... G06F 21/602; G06F 16/1824; G06F 16/1834; G06F 21/64; G06F 21/72;
(Continued)

(56) References Cited

U.S. PATENT DOCUMENTS 9,990,504 B1    6/2018  Chapman et al.
10,291,627 B2 *  5/2019  Gleichauf ............... H04W 8/24
(Continued)

FOREIGN PATENT DOCUMENTS

CN          107146087 A      9/2017
KR    10-2018-0014534 A     2/2018

OTHER PUBLICATIONS

Javaid et al., "BlockPro: Blockchain based Data Provenance and Integrity for Secure IoT Environments", Nov. 4, 2018, BlockSys' 18, p. 13-18.*
(Continued)

*Primary Examiner* — Christopher A Revak
(74) *Attorney, Agent, or Firm* — Harness, Dickey & Pierce, P.L.C.

(57) ABSTRACT

An electronic system includes a plurality of hardware devices and an authenticated circuit. The authenticated circuit is integrated, as fixed hardware, in the electronic system together with the plurality of hardware devices during a manufacturing process of the electronic system, the authenticated circuit configured to verify system integrity based on a system identification code provided from inside of the electronic system by at least one of the plurality of hardware devices, the system integrity indicating that a combination of the authenticated circuit and the plurality of hardware devices has not been modified since the manufacturing process, the authenticated circuit configured to perform a mining operation to generate a next block, the next block to be linked to a blockchain only in response to the authenticated circuit verifying the system integrity. Indiscriminate mining competition may be prevented or reduced in likelihood of occurrence.

20 Claims, 12 Drawing Sheets

(51) Int. Cl.
 *H04L 9/08* (2006.01)
 *H04L 9/32* (2006.01)
 *H04L 9/06* (2006.01)
(52) U.S. Cl.
 CPC .......... *H04L 9/0643* (2013.01); *H04L 9/0844* (2013.01); *H04L 9/3236* (2013.01); *H04L 9/3247* (2013.01); *H04L 2209/12* (2013.01); *H04L 2209/38* (2013.01)
(58) Field of Classification Search
 CPC ..... G06F 21/73; H04L 9/0844; H04L 9/3236; H04L 9/3247; H04L 9/0643; H04L 2209/38; H04L 2209/12; H04L 9/3234; H04L 9/3239; H04L 63/0853; H04L 63/123; H04L 67/1097; G09C 1/00
 See application file for complete search history.

(56) References Cited

U.S. PATENT DOCUMENTS

| | | | | |
|---|---|---|---|---|
| 10,839,378 | B1* | 11/2020 | Srinivasan | ........... G06Q 20/065 |
| 2014/0189890 | A1* | 7/2014 | Koeberl | ................ H04L 9/0866 726/34 |
| 2016/0275461 | A1 | 9/2016 | Sprague et al. | |
| 2017/0344987 | A1 | 11/2017 | Davis | |
| 2017/0346833 | A1 | 11/2017 | Zhang | |
| 2018/0097635 | A1 | 4/2018 | Moses | |
| 2018/0123882 | A1 | 5/2018 | Anderson et al. | |
| 2019/0035018 | A1* | 1/2019 | Nolan | ................... H04L 9/0637 |

OTHER PUBLICATIONS

Kravitz, "Transaction Immutability and Reputation Traceability: Blockchain as a Platform for Access-controlled IoT and Human Interactivity", 2017, 15th Annual Conference on Privacy, Security, and Trust, IEEE, p. 3-12.*

* cited by examiner

AUTHENTICATION CIRCUIT, ELECTRONIC SYSTEM INCLUDING THE SAME, AND METHOD OF FORMING NETWORK

CROSS-REFERENCE TO RELATED APPLICATION

This U.S. Non-provisional application claims priority under 35 USC § 119 to Korean Patent Application No. 10-2018-0108866, filed on Sep. 12, 2018, in the Korean Intellectual Property Office (KIPO), the disclosure of which is incorporated by reference in its entirety herein.

BACKGROUND

Example embodiments relate generally to an authentication circuit, an electronic system including the same, and/or a method of forming a network.

A blockchain that enables decentralization of data and information based on various consensus mechanisms is considered as a leading technology, e.g. a technology that may have many applications in the next generation. Numerous applications of blockchain technology are being proposed. These applications may benefit from a blockchain' s immunity against modification and/or manipulation. However, consensus methods used in the conventional blockchain platform requires high operational cost to guarantee and/or secure the integrity of the blockchain. As the interest in the blockchain increases, more nodes may participate in the blockchain. Thus the operation cost, e.g. the cost of securing the blockchain's immunity against modification and/or manipulation, increases. To prevent or reduce the likelihood of the increase of the operation cost, various methods have been proposed. For example, a memory-intensive consensus algorithm, e.g. a memory-intensive consensus algorithm, has been proposed. The memory-intensive consensus algorithm may prevent or reduce the likelihood of the use of different kinds of hardware, such as an application specific integrated circuit (ASIC) and/or a graphic processing unit (GPU) and/or a field programmable gate array (FPGA), etc., in the execution of the consensus algorithm. However, such methods may just change a kind and/or a form of the hardware pool used in mining. Such methods do not prevent or reduce the impact of indiscriminate competition. A barrier to entry in mining, e.g. into a mining pool, may be low with such methods, and the operation costs of maintaining the security of the algorithm may increase as the number of nodes increases. Accordingly, the value obtained from a blockchain that uses such a memory-intensive consensus algorithm may converge to the value of the conventional blockchain.

SUMMARY

Some example embodiments may provide an authenticated circuit for establishing a blockchain network having a low operation cost, and/or an electronic system including the authenticated circuit.

Some example embodiments may provide a method of forming a low-operation cost blockchain network using electronic systems including the authenticated circuits.

According to some example embodiments, an electronic system forming a node of a blockchain network includes a plurality of hardware devices, and an authenticated circuit. The authenticated circuit is integrated, as fixed hardware, in the electronic system together with the plurality of hardware devices during a manufacturing process of the electronic system. The authenticated circuit is configured to verify system integrity based on a system identification code provided from inside of the electronic system by at least one of the plurality of hardware devices, the system integrity indicating that a combination of the authenticated circuit and the plurality of hardware devices has not been modified since the manufacturing process. The authenticated circuit is configured to perform a mining operation to generate a next block, the next block to be linked to a blockchain only in response to the authenticated circuit verifying the system integrity.

According to some example embodiments, an authenticated circuit includes a data transceiver configured to perform communication with other nodes in a blockchain network and configured to store new transaction data to be included in a next block, a key authenticator configured to verify system integrity of an electronic system based on a system identification code provided from inside of the electronic system, the system integrity indicating that combination of the authenticated circuit and the electronic system has not been modified since assembling of the electronic system, and, in response to the key authenticator verifying the system integrity, the key authenticator is configured to perform an electronic signing operation with respect to the new transaction data provided from the data transceiver to generate signed data, a mining accelerator configured to generate the next block by perform a mining op, ration based on the signed data, and a block controller configured to verify validity of a block and the new transaction data provided through the data transceiver. The authenticated circuit is integrated in the electronic system, and the electronic system forms a node of the blockchain network.

According to some example embodiments, a method of forming a blockchain network includes providing a plurality of electronic systems as a plurality of nodes of a blockchain network, each of the plurality of electronic systems comprising an authenticated circuit configured to verify system integrity based on a system identification code provided from inside of each electronic system, the system integrity indicating that combination of the authenticated circuit and the corresponding electronic system has not been modified since assembly of the electronic system, and the authenticated circuit configured to perform a mining operation to generate a next block to be linked to a blockchain only in response to the authenticated circuit verifying the system integrity, generating, by at least one of the plurality of electronic systems, the next block, the next block including signed data, by performing an electronic signing operation with respect to transaction data to generate to the signed data, the performing the electronic signing operation being in response to verification of the electronic signing operation, and verifying, by each electronic system, block integrity of a received block received from outside of the each electronic system based on signed data included in the received block, the block integrity indicating that another electronic system generated the received block, the another electronic system being authenticated.

The authenticated circuit, the electronic system including the authenticated circuit, and/or the method of forming the blockchain network, according to some example embodiments, may prevent or reduce the impact of indiscriminate mining competition, for example by increasing an entry cost (e.g. a barrier to entry) into the blockchain network. The maintenance cost and/or the operation cost of maintaining the blockchain network may be reduced, while the integrity of the blockchain network may be secure.

BRIEF DESCRIPTION OF THE DRAWINGS

Example embodiments of inventive concepts will be more clearly understood from the following detailed description taken in conjunction with the accompanying drawings.

DETAILED DESCRIPTION OF EXAMPLE EMBODIMENTS

Figure 1:
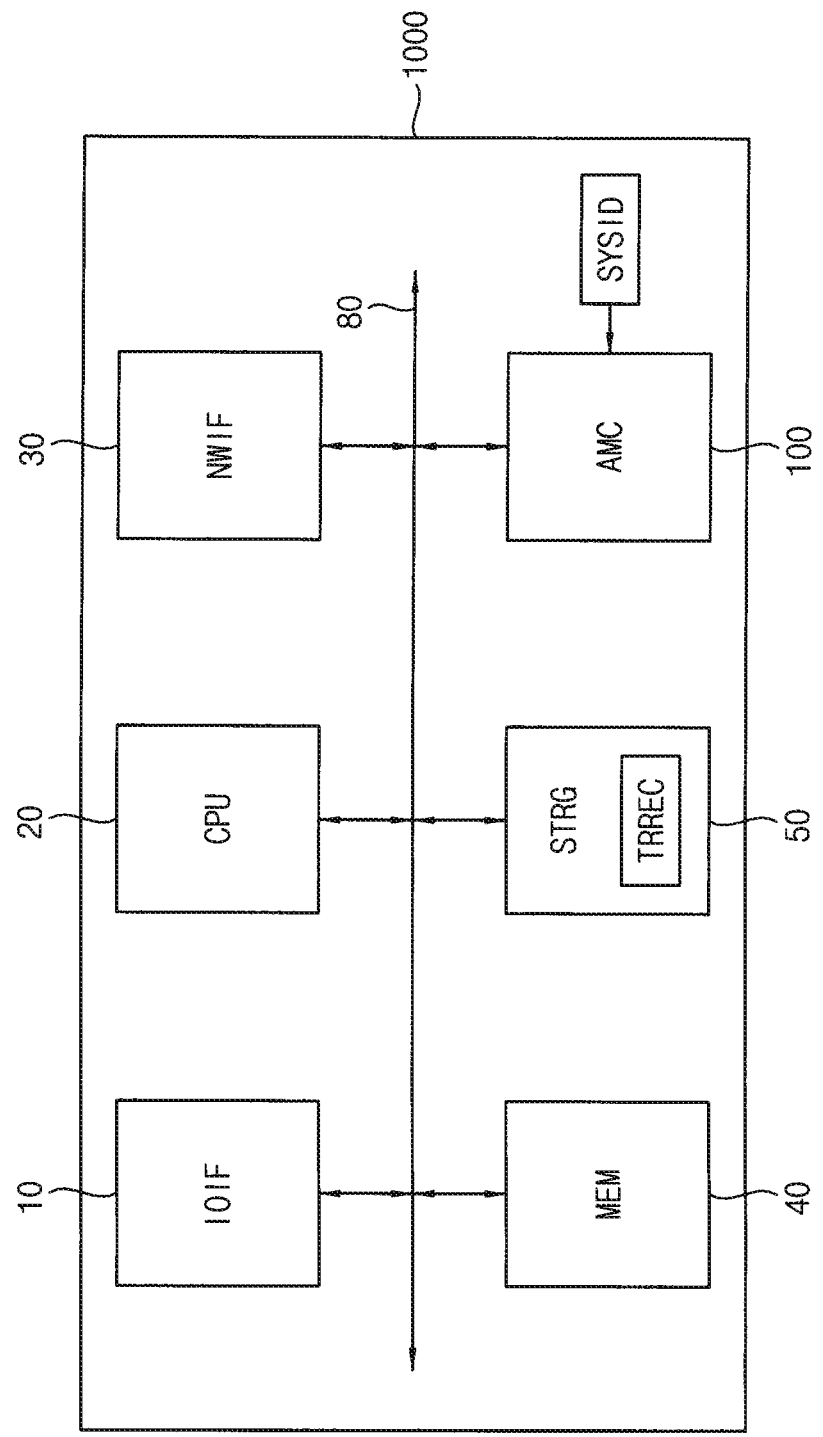
FIG. 1 is a block diagram illustrating an electronic system for a proof of device (PoD) blockchain network according to some example embodiments.

Various example embodiments will be described more fully hereinafter with reference to the accompanying drawings, in which some example embodiments are shown. In the drawings, like numerals refer to like elements throughout. The repeated descriptions may be omitted. Furthermore, each of, or at least some of, the functions described in flowcharts herein may be performed by hardware, such as hardware executing non-transitory machine readable instructions that, when executed, cause the hardware to perform the various functions described herein. Each of, or at least some of, the blocks described herein in the various block diagrams may be implemented in hardware such as, but not limited to be, an application-specific integrated circuit (ASIC), a graphics processing unit (GPU), a central processing unit (CPU), a field-programmable gate array (FPGA), and/or other hardware.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, or in some cases be performed in reverse order.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible or non-transitory computer-readable storage media as discussed herein.

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

FIG. 1 is a block diagram illustrating an electronic system for a proof of device (PoD) blockchain network according to some example embodiments.

Referring to FIG. 1, an electronic system 1000 includes a plurality of hardware devices 10, 20, 30, 40 and 50 and an authenticated mining circuit AMC 100. The plurality of hardware devices 10~50 and the authenticated mining circuit AMC 100 may be connected through a system bus 80. The system bus 80 may be included in the electronic system 1000.

The plurality of hardware devices 10~50 may be implemented with various combination depending on functions of the electronic system 1000. In some example embodiments, the electronic system 1000 may be or include a mobile device such as a smartphone. In this case, the electronic system 1000 may include an input-output interface circuit IOIF 10, a central processing unit CPU 20, a network interface circuit NWIF 30, a memory device MEM 40, and/or a storage device STRG 50 as illustrated in FIG. 1.

The input-output interface circuit 10 may connect the system bus 80 to various input-output devices such as a keyboard, a mouse, a touchscreen, a display device, a printer, a speaker, audio and video devices, and/or a microphone, etc. The various input-output devices such as the keyboard, the mouse, the touchscreen, the display device, the printer, the speaker, the audio and video devices, the microphone may not be included in the electronic system 1000.

The CPU 20 may execute an operating system (OS) of the electronic system 1000, and/or applications such as internet browsers, games, videos, etc. In some example embodiments, the CPU 20 may be implemented as an application processor (AP) including one or more processors.

The network interface circuit 30 may communicate with external devices, e.g., external devices not included in the electronic system 1000. For example, the network interface circuit 30 may support at least one of universal serial bus (USB) communication, Ethernet communication, near field communication (NFC), radio frequency identification (RFID) communication, mobile telecommunication, memory card communication, etc.

The memory device 40 may store data processed by the CPU 20 and/or operate as a working memory. For example, the memory device 40 may include dynamic random access memory (DRAM), static random access memory (SRAM), mobile DRAM, and/or the like.

The storage device 50 may store booting codes for booting the electronic system 1000. Alternatively or additionally, the storage device 50 may store application software and/or data. Particularly the storage device 50 may store transaction history and/or a transaction record TRREC of a blockchain, as will be described below. For example, the storage device 50 may be or include at least one of flash Memory, phase change random access memory (PRAM), resistive random access memory (RRAM), nano floating gate memory (NFGM), polymer random access memory (PoRAM), magnetic random access memory (MRAM), ferroelectric random access memory (FRAM), or the like.

The authenticated mining circuit 100 may be integrated, as fixed hardware, in the electronic system 1000, together with the plurality of hardware devices 10~50. The authenticated mining circuit 100 may be integrated with the plurality of hardware devices 10~50 during a manufacturing process of the electronic system 1000. In some example embodiments, the authenticated mining circuit 100 may be implemented as an independent module and/or a unit distinct from the plurality of hardware devices 10~50. In some example embodiments, the authenticated mining circuit 100 may be synthetically integrated as a portion of another hardware device. As a non-liming example, the authenticated mining circuit 100 may be synthetically integrated with the CPU 20 during fabrication of the CPU 20.

The authenticated mining circuit 100 may verify system integrity based on a system identification code SYSID provided from inside of the electronic system 1000, where the system integrity indicates that a combination of the authenticated mining circuit 100 and the electronic system 1000 is not modified, e.g., has not been modified since assembly of an integration of the electronic system 1000 with the authenticated mining circuit 100. The system identification code SYSID may be or include a digital value to identify at least one of the electronic system 1000 and at least one of the plurality of hardware devices 10~50.

In some example embodiments, the system identification code SYSID may include at least one serial number of at least one of the plurality of hardware devices 10~50, or a serial number of at least one of the modules included therein. When the electronic system 1000 is or includes a mobile device such as a smartphone, the system identification code SYSID may include international mobile equipment identity (IMEI) code. The IMEI code is assigned to the mobile device by the manufacture according to the guidelines of the global system of mobile communication (GSM).

The authenticated mining circuit 100 may store, in advance, a reference code corresponding to the system identification code SYSID, and may verify the system integrity by comparing the reference code stored in the authenticated mining circuit 100 and the system identification code SYSID provided from inside of the electronic system 1000.

In some example embodiments, the system identification code SYSID may be provided to the authenticated mining circuit 100 during an initialization process after the electronic system 1000 is assembled, and the authenticated mining circuit 100 may store the system identification code SYSID as the reference code during the initialization process.

In some example embodiments, to prevent or reduce the likelihood of illegal modification of the combination of the authenticated mining circuit 100 and the electronic system 1000, the authenticated mining circuit 100 may include a one-time programmable (OTP) memory, and may store, as the reference code, the system identification code SYSID provided during the initialization process in the OTP memory.

The authenticated mining circuit 100 may perform a mining operation to generate a next block to be linked to a blockchain only when the system integrity is verified. The authenticated mining circuit 100 may be configured to be disabled when the system integrity is not verified. When the authenticated mining circuit 100 is disabled, the authenticated mining circuit 100 may not to perform operations or calculations for mining.

As such, through integration of the authenticated mining circuit 100 in the electronic system 1000 and the verification of the system integrity, the mining operations may be performed only when the authenticated mining circuit 100 is not detached from the electronic system 1000, and the combination of the authenticated mining circuit 100 and the electronic system 1000 is not modified. As a result, entrance wall to the blockchain network may be established by limiting participation of a system or a device that does not include the normally-combined authenticated mining circuit 100.

The electronic system 1000 may be an apparatus of a relatively high price, such as a smartphone configured to perform other functions in addition to mining. For example, a smartphone may be configured to perform mobile communication in addition to mining. In this case, indiscriminate mining competition, e.g. an increase in a number of nodes performing mining and a corresponding increase in the operation costs of securing the integrity of the blockchain, may be prevented or reduced, at least partially because of the increase of the entry cost, e.g. increasing a barrier to entry, into the blockchain network. Thus, a maintenance cost or an operation cost of the blockchain network may be reduced while the integrity of the blockchain network is secured.

Figure 2:
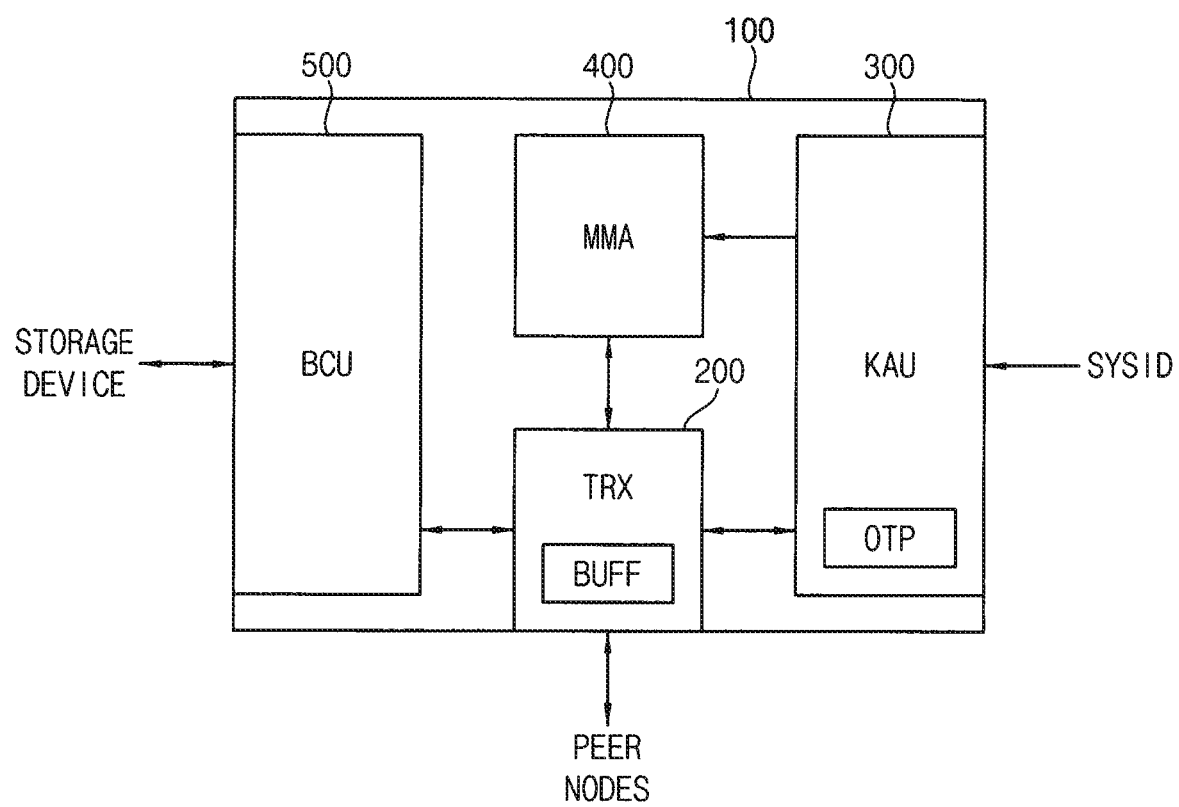
FIG. 2 is a block diagram illustrating an authenticated mining circuit according to some example embodiments.

FIG. 2 is a block diagram illustrating an authenticated mining circuit according to some example embodiments.

Referring to FIG. 2, an authenticated mining circuit 100 may include a data transceiver TRX 200, a key authenticator KAU 300, a mining accelerator MMA 400, and a block controller BCU 500.

The data transceiver 200 may perform communication with other nodes in the blockchain network and store transaction data to be included in a next block to be linked to a blockchain. The data transceiver 200 may include a transaction buffer BUFF to store the transaction data for the mining operation. In some example embodiments, the transaction buffer BUFF may be disposed outside the data transceiver 200.

The key authenticator 300 may verify the system integrity, indicating that the combination of the authenticated mining circuit 100 and the electronic system 1000 is not modified, e.g. has not been modified since assembly, as described above. In addition, the key authenticator 300 may perform an electronic signing operation with respect to the transaction data provided from the data transceiver to generate signed data, when the system integrity has been verified.

The mining accelerator 400 may perform the mining operation based on the signed data to generate the next block. In some example embodiments, the mining accelerator 400 may include a microprocessor to calculate a nonce value of the next block. The mining accelerator 400 may perform a mining algorithm associated with the blockchain. For example, the mining algorithm may be, but is not limited to be, based on a secure hash function such as SHA-256, and/or a memory hardened mining algorithm, and/or a hash algorithm based on scrypt. The hash function may be cryptographically secure, e.g. there may be no known method of inverting or partially inverting the hash function.

The block controller 500 may verify validity of a block and of the transaction data provided through the data transceiver. The block controller 500 may communicate with the storage device 50 in FIG. 1 that stores the transaction record TRREC so as to verify the validity of the block and the transaction data. When the validity of the transaction data is verified, the block controller 500 may send a verification result to the data transceiver 200, and the data transceiver 200 may store the valid transaction data in the transaction buffer BUFF. When the valid block is received, the block controller BCU 500 may request the storage device 50 to store the valid block in addition to the transaction record TRREC.

The mining accelerator 400 may be implemented as a relatively simple microprocessor of low power for performing the mining operation, for example, calculation of the nonce value of the next block, and/or determining if a hash of the nonce value of the next block concatenated with other block fields is below a currently set threshold associated with the blockchain. The mining accelerator 400 may receive the signed data, for example, the authenticated transaction data, from the key authenticator 300. The mining accelerator 400 may repeat a hash operation until the valid nonce value is obtained. When the valid nonce value, for example a nonce value that, when concatenated and/or combined with other fields of the block such as the hash value of the previous block, is below a currently set threshold associated with the blockchain, is obtained, the mining accelerator 400 may generate the next block, and may transfer the next block to the data transceiver 200. If the mining accelerator 400 receives new signed data from the key authenticator KAU 300 during the mining operation, the mining accelerator 400 may discard the previous signed data, and may resume the mining operation with respect to the new signed data.

The data transceiver 200 may communicate with other nodes connected in the blockchain network. When the data transceiver 200 receives valid transaction data from the blockchain network, the data transceiver may store the valid transaction data in the transaction buffer BUFF,. The transaction data stored in the transaction buffer BUFF may be used in the mining operation for the next block. The transaction data may be or include data associated with financial transactions, e.g. data associated with a ledger of financial transactions. However, inventive concepts are not limited thereto, and the transaction data may include data associated with other transactions. When the data transceiver 200 receives a valid block from the blockchain network, the valid block is transferred to the storage device 50 and added to the transaction record TRREC. In addition, the data transceiver 200 may transmit the valid block to the peer nodes, for propagation of the valid block in the blockchain network. The transaction data in the transaction buffer BUFF may be compared with the transaction data in the received valid block, and any overlapping data may be discarded from the transaction buffer BUFF. The transaction data remaining in the transaction buffer BUFF may be provided to the key authenticator 300 for the mining operation of the next block.

The key authenticator 300 may be used to authenticate entire mining procedure. The key authenticator 300 may, based on the system identification code SYSID provided from the inside of the electronic system 1000, verify the system integrity, indicating that the combination of the authenticated mining circuit 100 and the electronic system 1000 is not modified, e.g. has not been modified since assembly. The key authenticator 300 may provide the signed data for generating the next block linked to the blockchain only when the system integrity is verified.

In some example embodiments, the system identification code SYSID may be provided to the key authenticator 300 during an initialization process after the electronic system 1000 is assembled, e.g. an initialization process performed after or immediately during the first time the electronic system has been started. The key authenticator 300 may store the system identification code SYSID as the reference code during the initialization process. After the initialization process, the key authenticator 300 may verify the system integrity by comparing the reference code stored in the key authenticator 300 and the system identification code SYSID provided from inside of the electronic system 1000.

In some example embodiments, to prevent or reduce the likelihood of illegal modification of the combination of the authenticated mining circuit 100 and the electronic system 1000, the key authenticator 300 may include a one-time programmable (OTP) memory. OTP memory may refer to non-volatile memory devices within which, once the data are written or programmed, the data cannot be altered. After the data are programmed in the OTP memory cell, the structure of the OTP memory cell is changed irreversibly and the data, e.g. binary data such as '0' or '1,' may be stored in the OTP memory cell. The OTP memory device may be used variously as an embedded non-volatile storage for storing information on repair of other devices, analog trimming, security codes, for example. The OTP memory device may be implemented as a set of fuses and/or antifuses; however, inventive concepts are not limited thereto. The key authenticator 300 may store, as the reference code, the system identification code SYSID provided during the initialization process in the OTP memory.

Through such verification of the system integrity, a person and/or a group may be prevented or challenged to use a large number of illegal and/or unauthorized mining circuits. Accordingly, such persons and/or groups may be prohibited from dominating the consensus without paying a proper entry cost.

The key authenticator 300 may provide the signed data for generating the next block to be linked to the blockchain only when the system integrity is verified. By generating the next block using the signed data, the other nodes may verify block integrity, indicating that a received block is generated by another electronic system that is authenticated.

Figure 3:
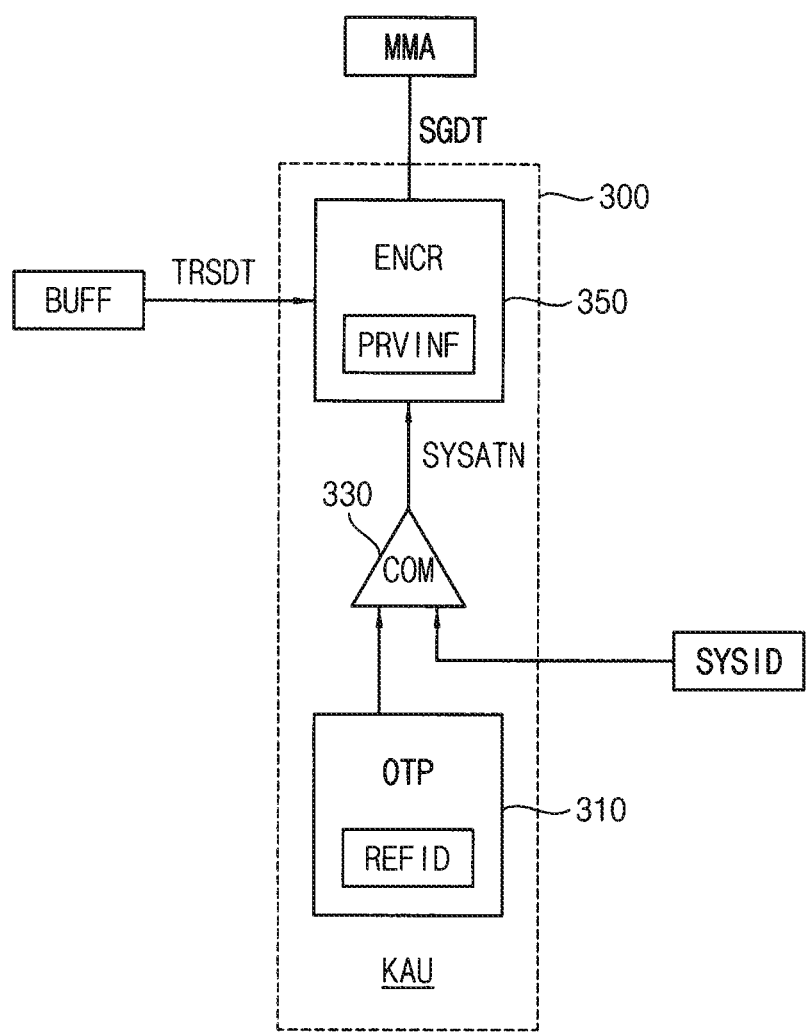
FIG. 3 is a block diagram illustrating an example embodiment of a key authenticator included in the authenticated mining circuit of FIG. 2.

FIG. 3 is a block diagram illustrating an example embodiment of a key authenticator included in the authenticated mining circuit of FIG. 2.

Referring to FIG. 3, a key authenticator 300 may include a one-time programmable (OTP) memory 310, a comparator COM 330, and an encryptor ENCR 350.

The OTP memory 310 may store a reference code REFID corresponding to a system identification code SYSID. As described above, the system identification code SYSID may be provided to the key authenticator 300 during an initialization process after, or only after, the electronic system 1000 is assembled, and the key authenticator 300 may store the system identification code SYSID as the reference code REFID in the OTP memory 310 during the initialization process. The storage of the reference code REFID during the initialization process may be controlled by the block controller 500 in FIG. 2 or the other logic in the electronic system 1000.

The OTP memory 310 may include a plurality of memory cells to store a plurality of bit of the reference code REFID. In some example embodiments, each of the memory cells may include a fuse element and at least one transistor to control programming and reading with respect to the fuse element. The fuse element may have a higher resistance value in a programmed state and a lower resistance value in an unprogrammed state. In some example embodiments, each of the memory cells may include an anti-fuse element and at least one transistor to control programming and reading with respect to the anti-fuse element. The anti-fuse element may have an electrical feature opposite to a typical fuse element such that the anti-fuse element has a higher resistance value in an unprogrammed state and a lower resistance value in a programmed state. In some example embodiments, the OTP memory 310 may include a plurality of memory cells including fuse elements and a plurality of memory cells including anti-fuse elements.

The comparator 330 may generate a system authentication signal SYSATN indicating a verification result of the system integrity, by comparing the reference code REFID stored in the OTP memory 310 with the system identification code SYSID provided from the inside of the electronic system 1000. The system authentication signal SYSATN may be a flag signal that has a first logic level (e.g., a logic high level) when the reference code REFID is identical to the system identification code SYSID and a second logic level (e.g., a logic low level) when the reference code REFID is different from the system identification code SYSID.

In some example embodiments, the comparator 330 may include a plurality of exclusive-OR (XOR) logic gates. An XOR logic gate outputs a logic low value when the input two bits have the same value and a logic high value when the input two bits have different values. Each of the plurality of XOR logic gates may receive each bit of both the system identification code SYSID and the reference code REFID, and may determine whether the two bits have the same value. When all of the plurality of XOR logic gates output the logic low value, the key authenticator 300 may determine that the system identification code SYSID is identical to the reference code REFID. The key authenticator 300 may generates the system authentication signal SYSATN indicating the system integrity.

The encryptor 350 may, when the system authentication signal SYSATN indicates that the system integrity is verified, perform an electronic signing operation with respect to the transaction data TRSDT provided from the transaction buffer BUFF to generate the signed data SGDT. The encryptor 350 may store private information PRVINF that is not disclosed to the public, and perform the electronic signing operation based on the private information PRVINF.

In some example embodiments, the private information PRVINF may be a private key of a digital value that is not disclosed to the public. The encryptor 350 may generate the block authentication signature based on the private key and transaction data TRSDT, and generate the next block including the transaction data TRSDT and the block authentication signature. For example, when the electronic system 1000 receives a block from outside of the electronic system 1000, the electronic system 1000 may verify block integrity of the received block based on a public key corresponding to the private key, a block authentication signature, and transaction data included in the received block. The block integrity indicates that the received block is generated by another electronic system that is authenticated, e.g. another electronic system similar to the electronic system 1000. The electronic signing operation and the verification of the block integrity will be described below with reference to FIGS. 8 and 9.

In some example embodiments, the private information PRVINF may be a private function that is not disclosed to the public. The encryptor 350 may generate the block authentication signature based on the private function and transaction data TRSDT, and may generate the next block including encrypted-signed data. For example, when the electronic system 1000 receives a block from outside of the electronic system 1000, the electronic system 1000 may restore original transaction data from encrypted-signed data included in the received block based on a public function corresponding to the private function. The block controller 500 may verify the block integrity by comparing the restored transaction data and the transaction record TRREC of the storage device 50.

Figure 4:
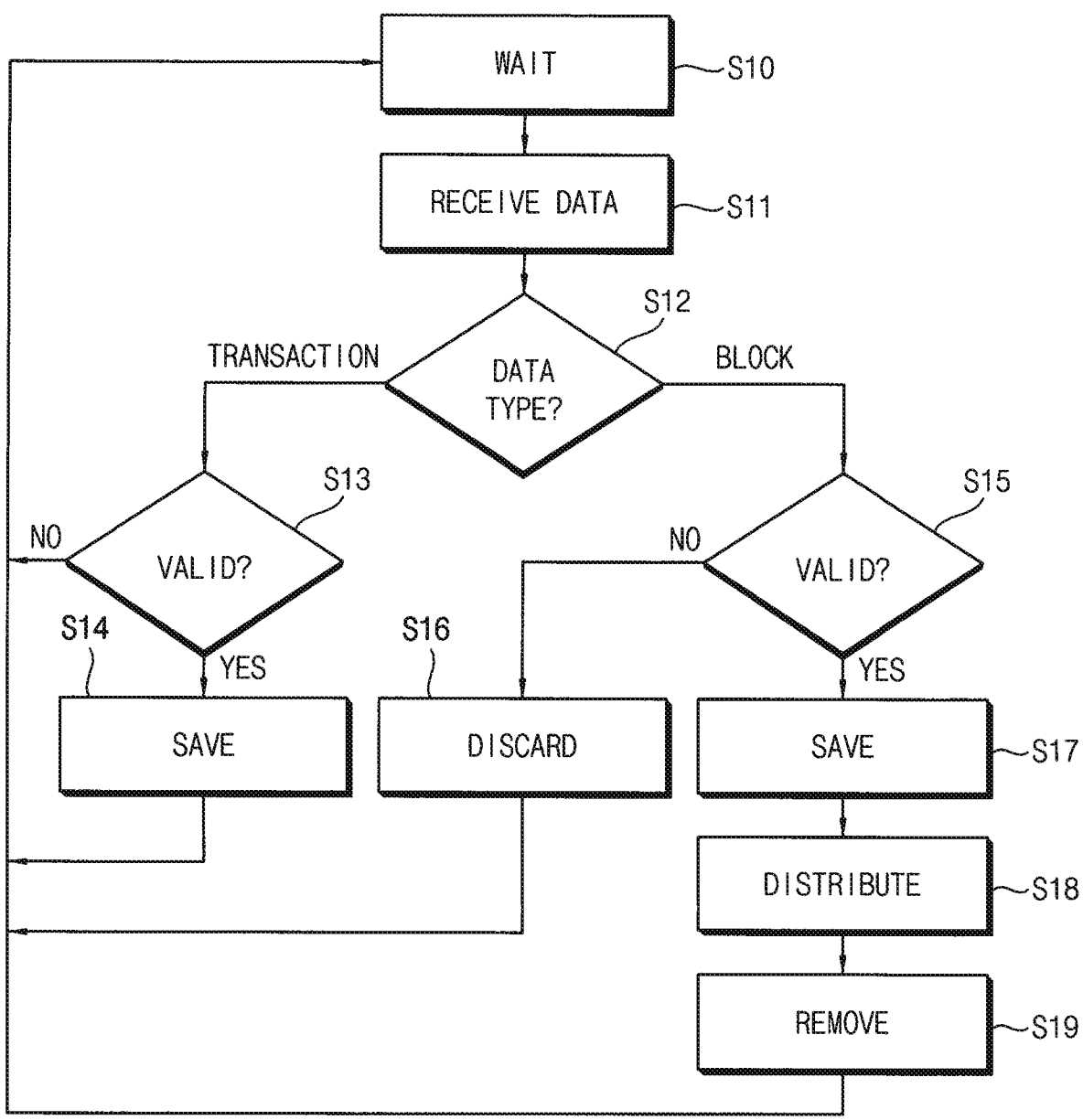
FIGS. 4 and 5 are flow charts illustrating operations of an authenticated mining circuit according to some example embodiments.
Figure 5:
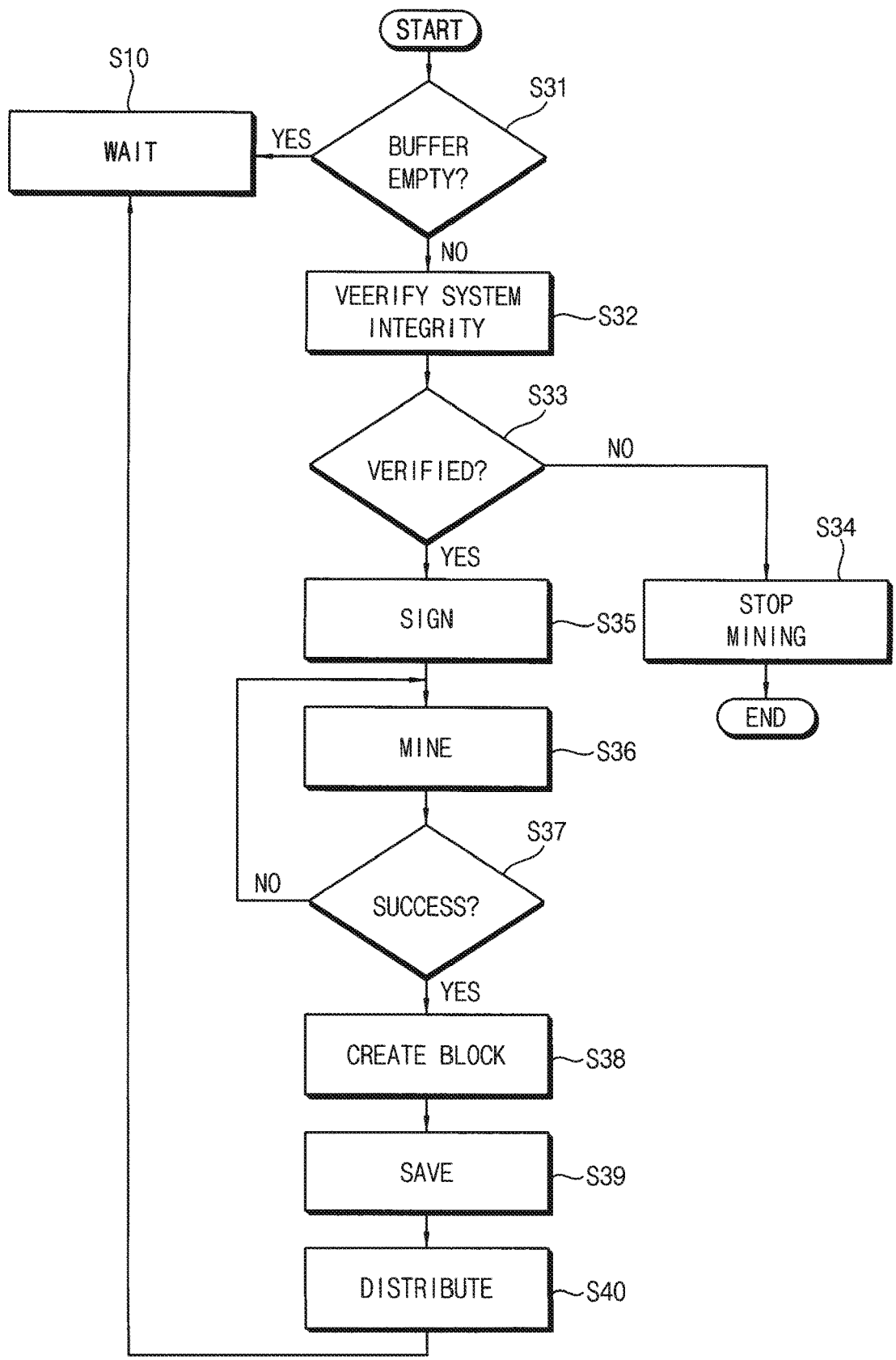

FIGS. 4 and 5 are flow charts illustrating operations of an authenticated mining circuit according to some example embodiments.

Referring to FIGS. 1 through 4, in a standby and/or wait state (S10), the authenticated mining circuit 100 may receive data through the data transceiver 200 (S11). The data may include a block, or may include transaction data from peer nodes in a blockchain network. The transaction data may include data associated with financial transactions, such as data associated with a ledger recording financial transactions; however, inventive concepts are not limited thereto. For example, the transaction data may be associated with, for example, a supply chain, smart property, insurance claims, the Internet of Things, and/or other forms of data. Alternatively or additionally, the data may include a next block that is generated by the mining accelerator 400 in the authenticated mining circuit 100.

The block controller 500 in the authenticated mining circuit 100 may determine a data type, determining whether the received data is a block, or is transaction data (S12).

When transaction data are received (S12: TRANSACTION), the block controller 500 may verify the validity of the received transaction data. The block controller 500 may determine that the received transaction data are valid, when the received data are compatible with the transaction record TRREC of the storage device 50. When the received transaction data are valid (S13: YES), the block controller 500 may store and/or save the received transaction data in the transaction buffer BUFF (S14), and may return to the standby state (S10). When the received transaction data are not valid (S13: NO), the block controller 500 may not store the received transaction data, and may return to the standby state (S10).

When a block, e.g. a new block generated by another electronic system, is received (S12: BLOCK), the block controller 500 may verify the validity of the received block. The block controller 500 may determine that the received transaction data are valid, when a nonce value of the received block satisfies a condition that is specified in a blockchain platform, such as but not limited to be having a value that, when concatenated and/or combined with other fields of the block, is lower than a specific threshold associated with the blockchain. Alternatively or additionally, the validity of the received block may include the block integrity indicating that the received block is generated by another electronic system that is authenticated, e.g. another electronic system similar to the electronic system 1000. As described above, the block integrity may be verified based on the public key corresponding to the private used for generation of the received block, the block authentication signature, and the transaction data included in the received block.

When the received block is valid (S15: YES), the block controller 500 may store the received block in the storage device 50, and may add the transaction data in the received block to the transaction record TRREC (S17). Alternatively or additionally, the block controller 500 may transmit the valid block to the peer nodes for distribution, e.g. propagation, of the valid block in the blockchain network (S18). The block controller 500 may compare the transaction data in the transaction buffer BUFF with the transaction data in the received valid block, and may remove or discard the overlapping from the transaction buffer BUFF (S19), and return to the standby state (S10). The transaction data remaining in the transaction buffer BUFF may be provided to the key authenticator 300 for the mining operation of the next block.

When the received block in not valid (S15: NO), the block controller 500 may discard the received block (S16) and may return to the standby state (S10).

When the received transaction data are not valid (S13: NO), the block controller 500 may not store the received transaction data and may return to the standby state (S10).

Referring to FIGS. 1 through 5, when the transaction buffer BUFF is empty (S31: YES), the authenticated mining circuit 100 returns to the standby or wait state (S10).

When transaction data are stored in the transaction buffer BUFF (S31: NO), the key authenticator 300 may verify the system integrity to start the mining operation (S32). In some example embodiments, the verification of the system integrity may be triggered when the number of transaction data stored in the transaction buffer BUFF is greater than a reference number.

As described above, the system integrity indicates that the combination of the authenticated mining circuit 100 and the electronic system 1000 is not modified, e.g. has not been modified since an initialization of the electronic system 1000. The key authenticator 300 may verify the system integrity based on the system identification code SYSID provided from the inside of the electronic system 1000.

For example, the system identification code SYSID may include and/or be associated with at least one of the IMEI of the electronic system 1000 and the serial number of at least one of the plurality of hardware devices 10~50 or modules included therein. The authenticated mining circuit 100 may store, in advance, the reference code REFID corresponding to the system identification code SYSID in the OTP memory 310, and may verify the system integrity by comparing the reference code REFID stored in the OTP memory 310 and the system identification code SYSID provided from the inside of the electronic system 1000. The verification result of the system integrity may be provided, as described above, through a flag signal such as the system authentication signal SYSATN. In some example embodiments, the system identification code SYSID may be provided to the authenticated mining circuit 100 during an initialization process performed after, e.g. immediately after and/or at a specific time after, the electronic system 1000 is assembled. The authenticated mining circuit 100 may store the system identification code SYSID as the reference code REFID during the initialization process.

When/if the system integrity is not verified (S33: NO), the key authenticator 300 may stop the mining operation (S34). For example, when the system integrity is not verified, the encryptor 350 does not perform the electronic signing operation, and the mining accelerator 400 may be disabled.

When/if the system integrity is verified (S33: YES), the encryptor 350 may perform the electronic signing operation with respect to the transaction data TRSDT provided from the transaction buffer BUFF, and may generate the signed data SGDT (S35). In some example embodiments, the electronic signing operation may include the generation of the block authentication signature based on the private key that is not disclosed to the public, and may include the transaction data provided from the transaction buffer BUFF for the mining operation of the next block.

The mining accelerator 400 may, when the system integrity is verified, perform the mining operation based on the signed data SGDT, to generate the next block to be linked to the blockchain (S36). For example, the mining operation may include repeating a hash operation, such as, but not limited to be, a SHA256 hash operation and/or a memory hardened hash operation and/or an scrypt hash operation, of the specified data including the transaction data TRSDT until the valid nonce is obtained as specified by the blockchain platform. The hash operation may have cryptographic properties, such as, for example, being difficult to invert.

When/if the mining accelerator 400 succeeds in obtain the valid nonce value (S37: YES), the mining accelerator 400 may generate or create the next block to be linked onto the blockchain (S38). The block controller 500 may receive the created next block through the data transceiver 200. The block controller 500 may store and/or save the next block in the storage device 50 (S39), and may distribute the next block the peer nodes connected to the blockchain network (S40).

As such, the authenticated mining circuit and the electronic system including the authenticated mining circuit according to some example embodiments may prevent or deter indiscriminate mining competition, by increasing an entry cost, e.g. increasing the barrier to entry, into the blockchain network. For example, an indiscriminate miner may be required to purchase a large number of smart phones having the authenticated mining circuit, in order to improve the probability that the indiscriminate miner succeeds in winning the mining reward/commission. Because a smart phone performs many functions, such as web browsing and/or music playback, the indiscriminate miner may have to dedicate a fixed cost to the smart phone, including costs of hardware associated with web browsing and/or music playback. Accordingly, a reduction in a maintenance cost and/or an operation cost of the blockchain network may be achieved, while securing integrity of the blockchain network.

Figure 6:
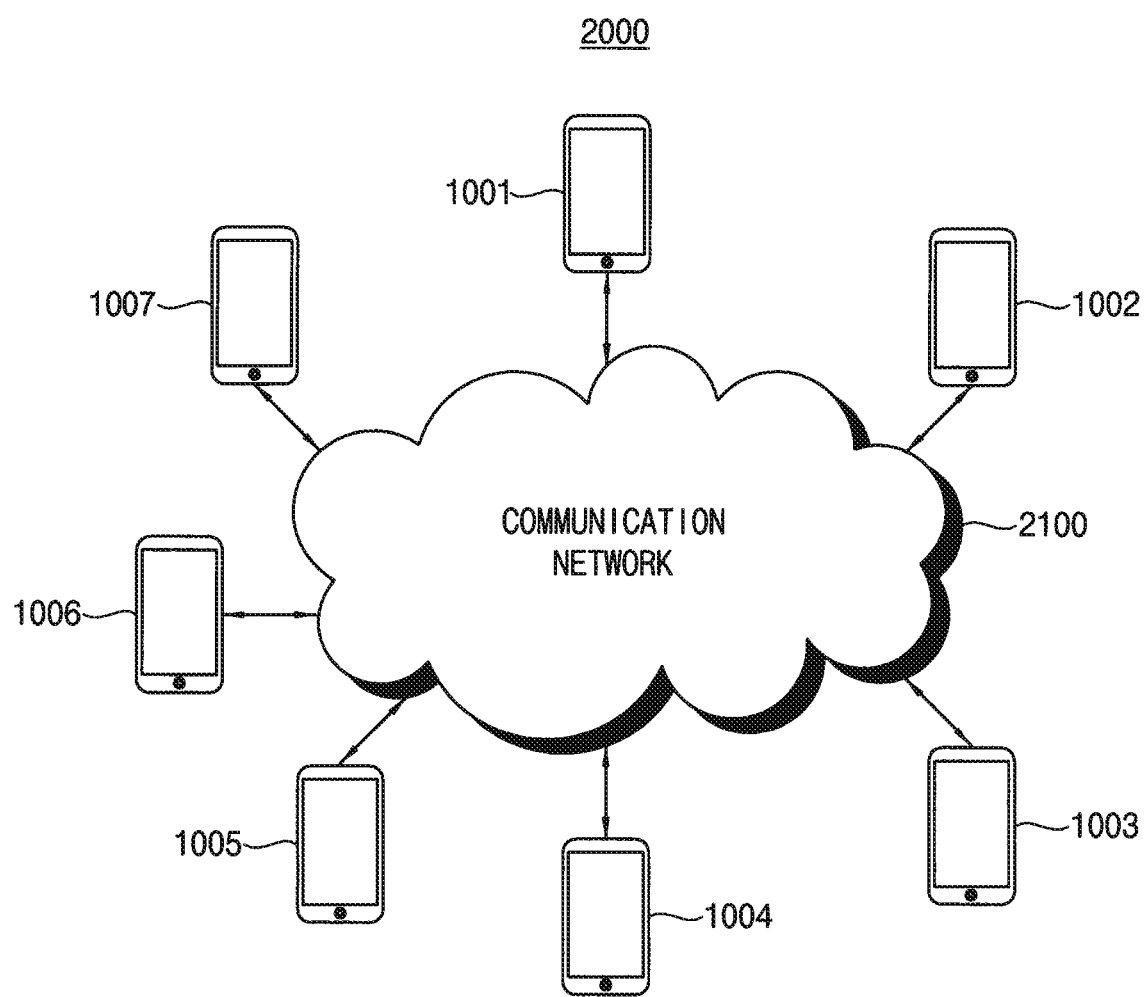
FIG. 6 is a diagram illustrating a blockchain network using electronic systems including authenticated mining circuits according to some example embodiments.

FIG. 6 is a diagram illustrating a blockchain network using electronic systems including authenticated mining circuits according to some example embodiments.

Referring to FIG. 6, a blockchain network 2000 may include a communication network 2100 and a plurality of electronic systems 1001~1007 connected to the communication network 2100. The plurality of electronic systems 1001~1007 may form nodes of the blockchain network 2000 and the number of the nodes may be determined variously.

All, or atleast a portion of, the plurality of electronic systems 1001~1007 may include the authenticated mining circuit 100 as described above. All, or at least a portion of, the plurality of electronic systems 1001-1007 may include at least one of the plurality of hardware devices 10~50. A particular one of the plurality of electronic systems 1001~1007 may include the same as, or different ones, of the plurality of hardware devise 10~50, as another particular one of the plurality of electronic systems 1001~1007. Each electronic system including the authenticated mining circuit 100 may verify system integrity based on a system identification code provided from inside of the respective each electronic system, where the system integrity indicates that the combination of the authenticated mining circuit and the respective electronic system is not modified. Each authenticated mining circuit 100 may perform a mining operation to generate a next block to be linked to a blockchain only when the system integrity is verified. As such, the electronic systems including the authenticated mining circuits may function as blockchain service providers, e.g. blockchain miners. Alternatively or additionally, at least a portion of the plurality of electronic systems 1001~1007 may not include the authenticated mining circuit 100, and at least a portion of the plurality of electronic systems 1001~1007 may function as blockchain service users and not blockchain service miners.

From a blockchain service user's point of view, the blockchain service user may benefit from whatever the blockchain application does, and the blockchain service user may pay blockchain service miners for the service, for example in the form of commission and/or in the form of a mining reward wherein a miner receives newly created and/or minted currency. Then, commissions and/or mining rewards may be distributed to the blockchain service miners, as a reward to compensate the blockchain service miners' mining cost. The commissions and/or mining rewards may be distributed based on the blockchain platform policy. The blockchain service user may desire to store his or her assets safely in the blockchain. The blockchain service miners may attempt to create the block that holds the asset. When one of the blockchain service miners succeeds in creating the proper block, the blockchain service miner receives reward.

A problem in blockchain networks may be that the overall cost is not, or cannot be, technically controllable. Modification of the consensus mechanism and/or invention of new hardware that reduces the mining cost is not a solution. At first, such a modification and/or invention of new hardware will reduce the overall cost. However, more miners may enter the competition, due to the reduced cost of entry and to the improved payability. Here, payability is the percentage of gain over a miner's investment. Eventually, the overall cost increases until the payability meets some specific point, which may be defined as the minimum payability.

Inventive concepts may improve over this and other problems, with a blockchain network having high entry cost (e.g. high barrier to entry) and a low operation cost (HELO) concept. According to some example embodiments, an electronic system implements the HELO blockchain network. In the HELO blockchain network, the above-described authenticated mining circuit 100 is integrated in a base system of a relatively large scale, e.g., the above-described electronic system. The base system may act as the entry cost to become a new mining node. The base system may satisfy at least the following characteristics:

Firstly, the base system should or may be widely used regardless of the mining feature.

Secondly, the base system should or may be resistant to modification by an end user.

Thirdly, the base system should or may give extremely low value to a person who owns more than one base system.

A smartphone is a candidate, e.g. among the best candidates, that satisfies all three conditions. The hardware architecture of a smartphone may be challenging to modify after assemble. A person may not benefit much from having hundreds of smartphones. Thus, the HELO concept according to some example embodiments may be efficiently applied to the smartphone. A blockchain platform by the consensus mechanism according to example embodiments may be referred to as a platform based on Proof of Phone (PoP). Example embodiments may be applied to an device satisfying the above conditions in addition to mobile devices such as the smartphone, and, in general, the blockchain based on the novel consensus mechanism may be referred to as a Proof of Device (PoD) blockchain.

PoP blockchain is basically a type of a Proof of Work (PoW) blockchain. Each participating node competes each other participating node to mine the first valid block that can be attached to the blockchain. Mining a valid block may include finding the proper nonce value that satisfies a predefined block mining rule, in the same way as in an ordinary PoW blockchain. Such a PoW blockchain may be applied to example embodiments of inventive concepts. However, a valid block in the PoP blockchain according to some example embodiments also is required to have a valid block authentication signature as described above. This block authentication signature may be identified by any computing device, but the block authentication signature can be generated only by an authenticated hardware integrated in a smartphone. The above-described authenticated mining circuit 100 may correspond to authenticated hardware and the above-described electronic system 1000 may correspond to the smartphone. The authenticated mining circuit 100 may generate the block authentication signature only for the block that is generated by the mining accelerator 400 included in the authenticated mining circuit 100.

The authentication hardware is designed to generate the signature only for the block mined from the authentication hardware's' dedicated mining module. FIG. 2 depicts an example structure of the PoP blockchain. Similar to a typical blockchain, each block has a mined nonce value. This nonce value is required to be recognized as a valid block. The asset stored in each block needs to have a valid authentication signature which is generated by authentication hardware.

Figure 7:
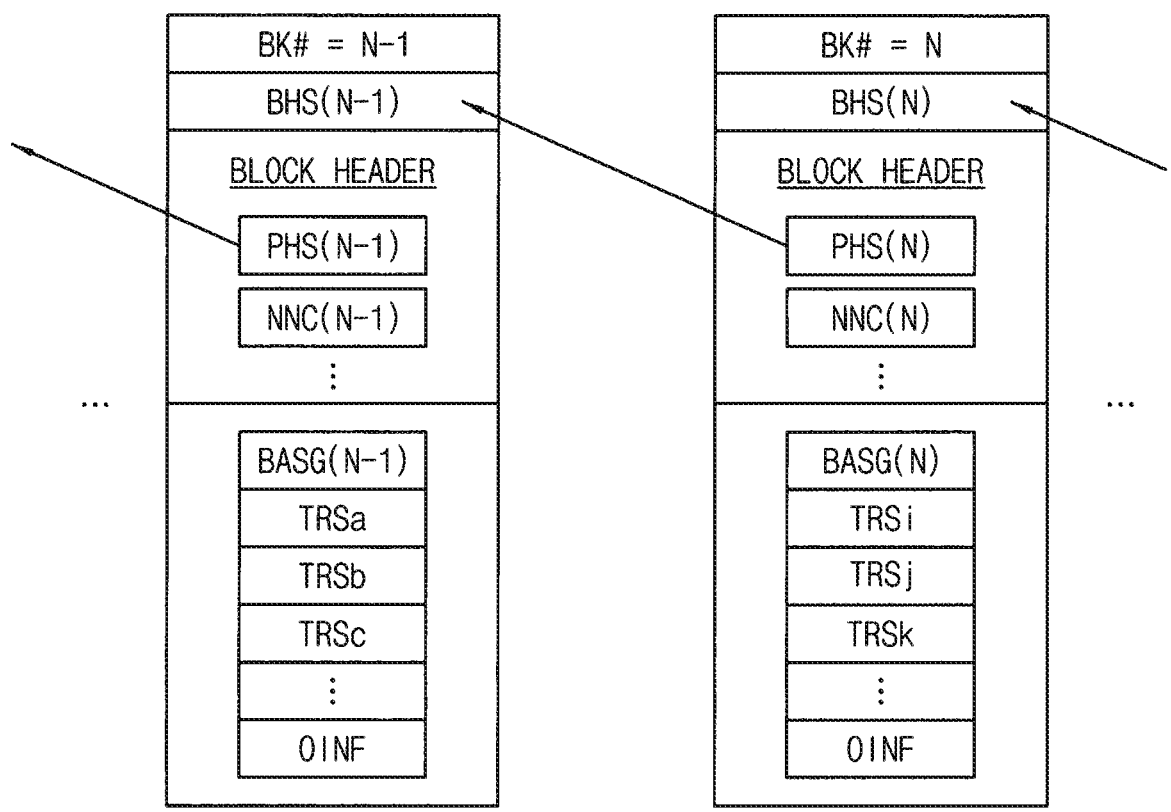
FIG. 7 is a diagram illustrating a blockchain of a PoD blockchain network according to some example embodiments.

FIG. 7 is a diagram illustrating a blockchain of a PoD blockchain network according to some example embodiments.

Referring to FIG. 7, a blockchain is a distributed public ledger and a collection of valid blocks that are generated sequentially. For convenience of illustration, FIG. 7 illustrates only two blocks having the block number BK# of N-1 and N.

The PoD blockchain according to some example embodiments may be a PoW blockchain. Each block may include a block hash BHS, a block header, transaction information TRS such as data corresponding to financial transactions, and other information OINF.

The block header includes fields having a previous block hash PHS, and a nonce value NNC. Even though not illustrated in FIG. 7, the block header in the PoW block chain may further include a version, a merklehash, a time and difficulty bits.

The previous block hash PHS corresponds to a block hash of a previous block that is located, e.g. is at a height, just before the corresponding block. For example, the block hash BHS(N-1) of the (N-1)-th block corresponds to the previous block hash PHS(N) of the N-th block.

The field containing the version includes the version of software and/or protocol for implementing the blockchain platform. The field containing the merklehash includes a hash value of a tree root, e.g. a Merkle tree root, when the individual transaction information are arranged in a form of a binary tree. The time indicates when the block is created, and the difficulty bits indicate degree of toughness in creating blocks of the blockchain. The field containing the nonce value includes the calculation number that may increase and/or decrease, e.g. sequentially, from a certain value, e.g. 0, until a hash value satisfying a specified condition is obtained. The specified condition may include a hash of the nonce value and other block fields is than a threshold value. The threshold value may be based on a moving average of the length of time taken to determine a nonce.

The block hash functioning as an identity of the block is obtained using information of the block header as an input. For example, the block hash may be a value of 32 bits that may be calculated by applying a hash function, such as SHA256 and/or a memory hardened hash function and/or an scrypt hash function, to the version, the previous block hash, the merklehash, the time, the difficulty bits, and the nonce value.

The blocks may include different transaction information. For example, the (N-1)-th block may include the transaction data TRSa, TRSb, TRSc, etc., and the N-th block may include the transaction data TRSi, TRSj, TRSk, etc. The other information OINF indicate information other than the block header and the transaction information, and are not used in the calculation of the block hash.

Eventually the individual transaction information may be summarized in the merklehash that is the hash value of the Merkle tree root. Among the fields included in the block header, the version, the previous block hash, the merklehash, the time, and the difficulty bits are determined, and may be fixed before calculating the block hash. However, the nonce value is not fixed, and is to be calculated, e.g. has to be calculated in order to secure the blockchain. Mining may include searching for the nonce value so as to finally calculate the block hash, and creating a valid block having the block hash as an identity of the valid block.

The source of trust in the linked list of transactions of the blockchain is the PoW. For example, the PoW creates the valid block having the above-described block hash as the identity.

The nonce value is a value that may make the block hash calculated by the nonce value be smaller than (or larger than) a specific number. The nonce value may be concatenated with some of, or all of, the block header, the version, the previous block hash, the merklehash, the time, and the difficulty bits, and the concatenated result may be hashed to form the block hash. In searching the input value that leads to the block hash of a specific value, the input value may be determined by reverse calculation based on the resultant hash value. Depending on the cryptographic properties of the hash function, the only solution to find the input value may be repeating the calculation of the hash value while changing the input value until the desired hash value is calculated. For example, the block hash value, being a cryptographic hash based on the nonce value, the previous block hash value, and transaction data, is calculated repeatedly, while changing the nonce value until the calculated hash value satisfies the specific condition. The PoW is finished when such nonce value is obtained and the corresponding hash value is determined finally as the block hash of the new created block.

As illustrated in FIG. 7, according to some example embodiments, each block may include a block authentication signature BASG. The electronic system that succeed in mining the valid next block may generate the block authentication signature BASG based on the private key and the transaction data to be included in the next block to generate the next block including the transaction data and the block authentication signature BASG, only when the system integrity is verified. Alternatively or additionally, the electronic system may verify block integrity based on the block authentication signature BASG and the transaction data included in a received block, where the block integrity indicates that the received block is generated by another electronic system that is authenticated.

Figure 8:
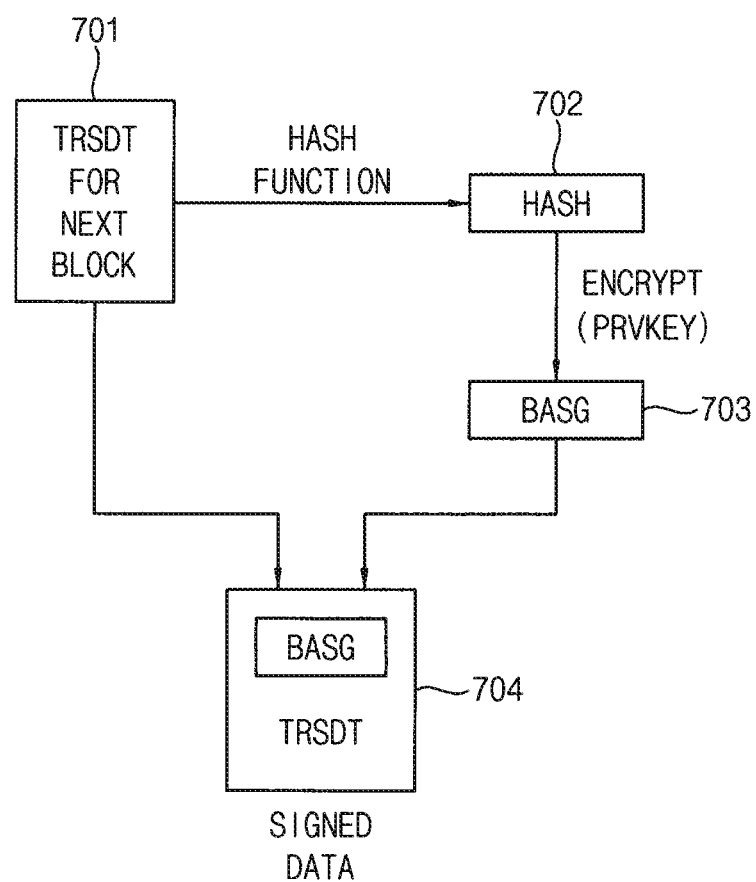
FIG. 8 is a diagram illustrating a block signing process of an authenticated mining circuit according to some example embodiments.
Figure 9:
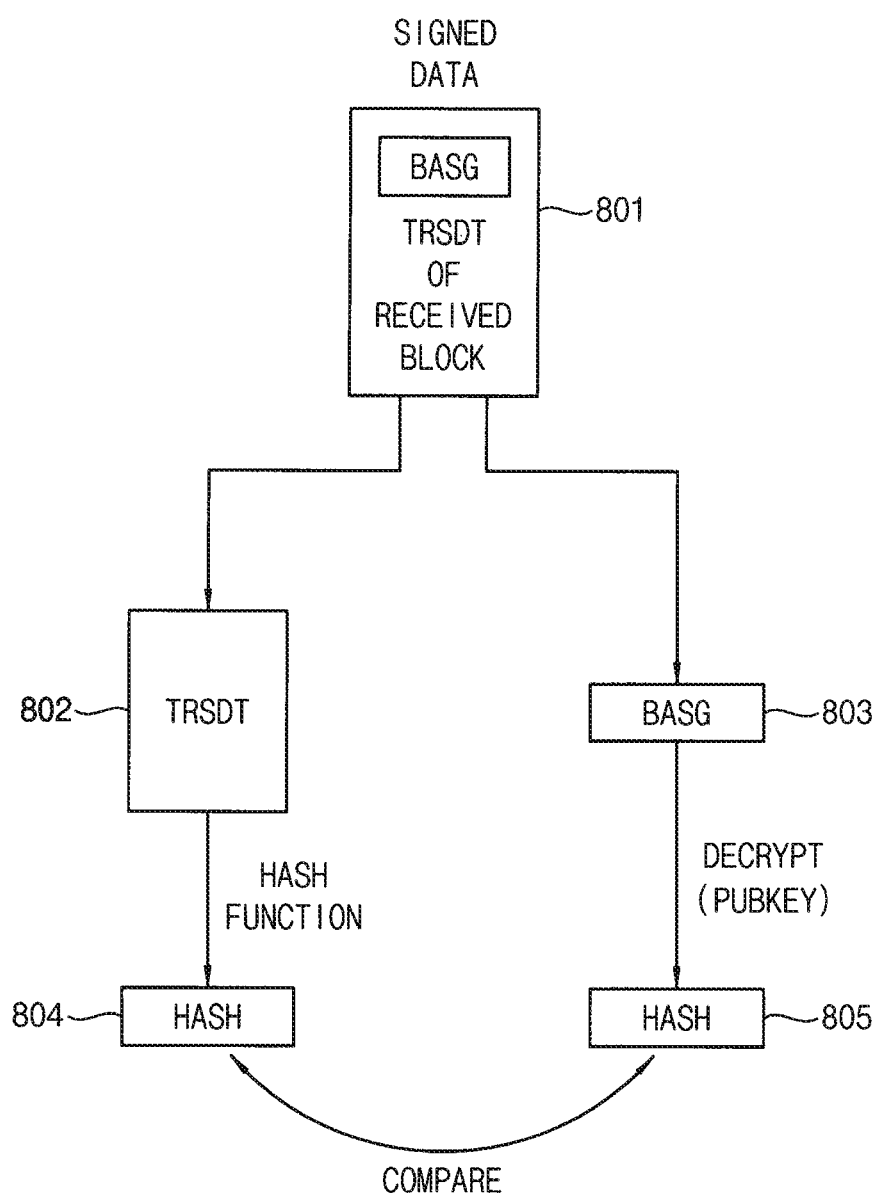
FIG. 9 is a diagram illustrating a verification process of block integrity according to some example embodiments.

FIG. 8 is a diagram illustrating a block signing process of an authenticated mining circuit according to some example embodiments, and FIG. 9 is a diagram illustrating a verification process of block integrity according to some example embodiments.

Referring to FIGS. 1 through 9, when the system integrity is verified, the key authenticator 300 may calculate a hash value 702 by applying a hash function to the transaction data TRSDT 701 for the next block. In some example embodiments, the key authenticator 300 may generate the block authentication signature BASG 703 by encrypting the transaction data 701 using a private key PRVKEY that is not disclosed to the public. The block authentication signature 703 may be attached to the transaction data 701. The transaction data 701 including the block authentication signature 703 may be provided to the mining accelerator 400 as the signed data 704.

Referring to FIGS. 1 through 9, the electronic system 1000 connected to the blockchain network according to some example embodiments may receive a block 801 including the signed data from a peer node in the blockchain network. As described above, the received block 801 may include the transaction data TRSDT 802 and the block authentication signature BASG 803. The electronic system 1000 may apply the hash function to the transaction data 802 to calculate a hash value 804. In addition, the electronic system 1000 may apply the hash function to the block authentication signature 803 to calculate another hash value 805. When the hash value 804 of the transaction data 802 is identical to the hash value 805 of the block authentication signature 803, the electronic system 1000 may determine that the received block 801 is generated by another electronic system that is authenticated, and may verify the block integrity of the received block 801.

Figure 10:
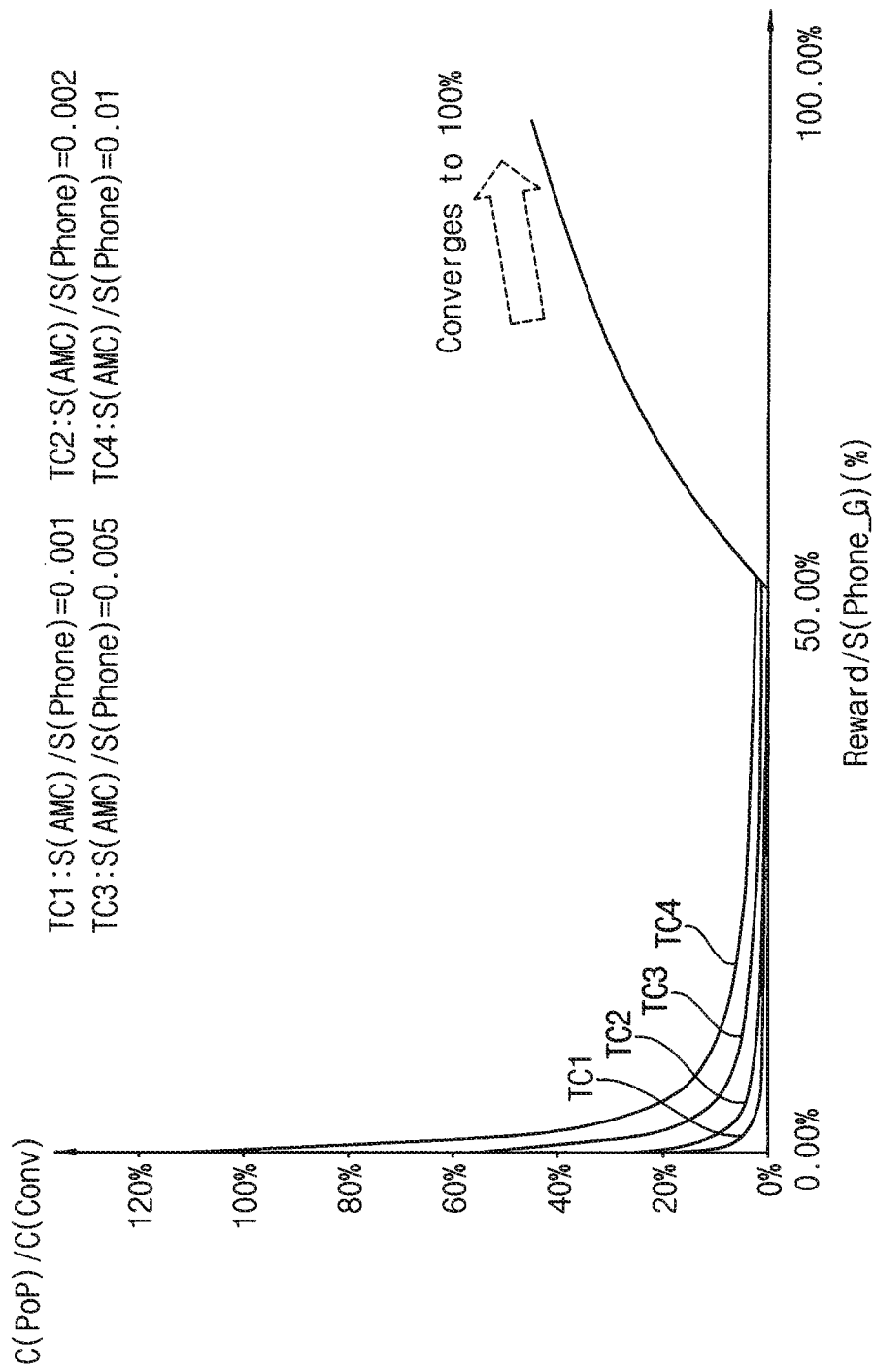
FIG. 10 is a diagram for describing a cost of a PoD blockchain network according to some example embodiments.

FIG. 10 is a diagram for describing a cost of a PoD such as a PoP blockchain network according to some example embodiments.

In the conventional blockchain platform, a total cost includes electricity costs and other variable costs, and capital costs, as well as depreciation of mining devices. The total cost may be simply derived from the payability of the blockchain platform as Equation 1:

$$C(Conv)=RWD/(1+Pmin) \qquad \text{Equation 1}$$

In Equation 11, C(Conv) is the total cost used for mining in the conventional blockchain platform per year, RWD is the total reward generated by the platform per year, and Pmin is the minimum payability for the miners to keep mining. The payability Pmin is included in Equation 1 to reflect inflation, and compensation for risk. When the total reward RWD increases, additional investments are made to get more rewards. For example, additional miners may engage in performing mining operations, for example, to secure a commission and/or a mining reward, from successfully finding a nonce that satisfies the requirements of the blockchain protocol. As more additional miners engage in performing mining operations, the probability of a single miner securing the reward RWD decreases. If the total reward RWD decreases, and payability does not satisfy the minimum payability Pmin, some of the miners will stop running their device. As a result, the cost converges to a proportional value to the reward, as shown in Table 1.

TABLE 1

| Pmin | 0 | 0.1 | 0.2 | 0.3 |
|---|---|---|---|---|
| C(Conv)/RWD | 1.00 | 0.91 | 0.83 | 0.77 |

In case of PoP blockchain platform according to some example embodiments, there are several methods to reduce, e.g. minimize, the operation cost, based on the dedicated hardware. Thus, the total cost is mostly derived from the entry cost, which is applied differently depending on the type of miners.

For general smartphone users, herein denoted as general miners, the only overhead is the price of the authenticated mining circuit. On the other hand, for a dedicated miner who wishes and/or desires to buy more smartphones just for mining, the cost, e.g. the net present value, includes not only the price of the authenticated mining circuit but also the depreciation price of smartphone.

As an example described below, it may be assumed for convenience of description that the lifetime of the authenticated mining circuit is one year, to prevent or reduce excessive increase of the mining devices and impose proper entry cost for new dedicated miners. In case of the depreciation of the smartphone, calculating a precise value may be difficult, but may be defined as 50% of original price after a year, based on several p2p web markets.

The total cost of the PoP blockchain platform may be derived with different formulas for dedicated miners and general miners as Equation 2, Equation 3, and Equation 4.

$$C(PoP\_D)=S(AMC\_D)+S(Phone\_D)\times 0.5 \qquad \text{Equation 2}$$

$$C(PoP\_G)=S(AMC\_G) \qquad \text{Equation 3}$$

$$C(PoP)=C(PoP\_G)+C(PoP\_D) \qquad \text{Equation 4}$$

In Equation 2, Equation 3 and Equation 3, C(PoP) is the annual cost of the PoP blockchain platform, C(PoP_D) is the annual cost for the dedicated miners, C(PoP_G) is the annual cost for the general miners, S(AMC_D) and S(Phone_D) are the annual sales of the authenticated mining circuits and smartphones to the dedicated miners, respectively, S(AMC_G) is the annual sales of the authenticated mining circuits to the general miners, and 0.5 is the depreciation rate.

General miners are not affected by the payability of the blockchain. However, dedicated miners are sensitive to the payability of the blockchain, and follow the same rule from Equation 1. Since the reward is distributed to the miners based on the mining power, the condition for increase of dedicated miners may be expressed as Equation 5.

$$RWD \geq \{1+(S(AMC\_G)/S(AMC\_D))\}\times C(PoP\_D) \qquad \text{Equation 5}$$

From Equation 5, the number of the dedicated miners increases when the reward becomes larger, and the total cost for the PoP blockchain platform increases. On the other hand, if Equation 5 cannot be satisfied, the dedicated miners will reduce until none exists. Considering high expectation of the smartphone and authenticated mining circuit sales to general users, increase of dedicated miners is likely to be reduced, e.g. minimized.

As illustrated in FIG. 10, the total cost of the PoP blockchain platform may be compared with that of the conventional blockchain, in respect to the varying reward. In FIG. 10, the horizontal axis indicates the ratio of the reward with respect to the annual sales of the smartphones for the general users and the vertical axis indicates the ratio of the total cost of the PoP blockchain platform with respect to the total cost of the conventional blockchain platform. In the analysis of FIG. 10, it was assumed that Pmin is 0.1. Four different conditions of S(AMC)/S(Phone) are shown in FIG. 10, where the TC1 is 0.001, TC2 is 0.002, TC3 is 0.005 and TC4 is 0.01.

When the reward is extremely small, C(PoP) is larger than C(Conv), since the sales of the authenticated mining circuits becomes an overhead at this region. Thus, C(PoP)/C(Conv) may be higher than 100% in the leftmost portion of FIG. 10. However, C(PoP)/C(Conv) decreases exponentially as the reward becomes larger.

There are some differences in the gradients of decrease depending on the S(AMC)/S(Phone), but C(PoP) becomes lower than C(Conv) for all cases when the reward is larger than 1.1% of S(Phone_G).

When the reward becomes higher, C(PoP)/C(Conv) also keeps on decreasing until some specific points. These points may be the ideal case for the PoP blockchain platform, where the cost difference is largest compared with the conventional blockchain platform. The ideal case is observed where the reward is between 55.1% and 56.1% of S(Phone_G). On that case, C(PoP) is only 0.2%, 0.4%, 1% and 2% of C(Conv), where S(AMC)/S(phone) is 0.1%, 0.2%, 0.5% and 1%, respectively. The value is especially lower when S(AMC)/S(phone) is smaller, since the cost of AMC dominates the total cost of PoP, in this region.

When the reward increases over the ideal point, C(PoP)/C(Conv) starts increasing. This is due to the increase of the dedicated miners. No dedicated miners may exist before the ideal points, since the Equation 5 cannot be satisfied. As the reward keeps on increasing, there will be more portion of the dedicated miners which causes higher cost. However, regardless of the growth of the reward, C(PoP) is always strictly less than C(Conv), since there are still some portion of general miners left in the PoP blockchain platform. In addition, the condition of very high reward paradoxically indicates a success of the PoP blockchain platform, when considering the annual sales of smartphone.

Figure 11:
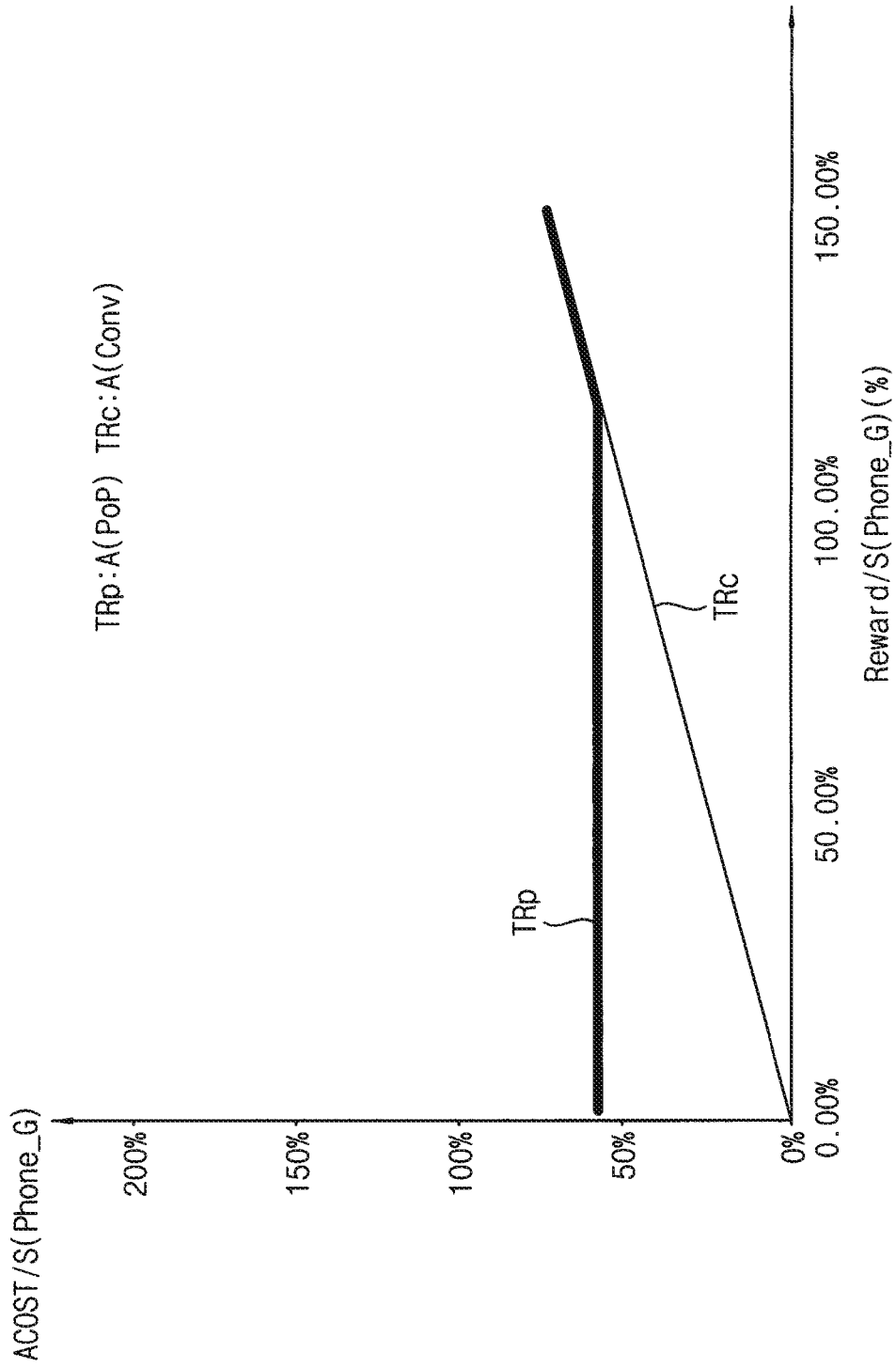
FIG. 11 is a diagram for describing an attack cost of a PoD blockchain network according to some example embodiments.

FIG. 11 is a diagram for describing an attack cost of a PoD blockchain network according to some example embodiments.

Typically, one of the biggest threats in a blockchain platform may be or include the double-spending attack, where a node attempts to transfer assets to more than two different nodes at the same time. In order to prevent or reduce the likelihood of such a threat, a probabilistic approach has been proposed, to approve the transaction only after a number of following blocks are mined. Assuming a general status, e.g. assuming the cryptographic security of the hash used in mining, it becomes stochastically impossible to undo or modify the transaction. However, with higher mining power, there may be higher chance to undo or modify a previous transaction.

In general, the mining power is proportional to the mining cost. Therefore, the attack cost may be considered as 50% of the total mining cost. In the conventional blockchain platforms, the payability and the reward are the only factors that determine the total cost. If an attacker increases his mining power by spending more cost, the payability of the blockchain platform decreases. Then, a portion of existing miners may or will stop mining, due to the low payability, until the total cost goes down to satisfy the minimum payability. Consequently, the total cost remains steady and the attacker only needs to afford 50% of the original cost. Referring to Equation 1, the attack cost may be derived as Equation 6.

$$A(\text{Conv}) = \{RWD/(1+Pmin)\} \times 0.5 \qquad \text{Equation 6}$$

In Equation 6, A(Conv) is the attack cost in the conventional blockchain platform. The attack cost of the PoP blockchain platform according to some example embodiments is also affected by the total cost of the blockchain. However, the attack cost cannot be simplified to 50% of the total cost, due to the different behavior of general miners. Unlike the dedicated miners, the general miners do not buy or sell their smartphones in response to the change in payability. Therefore, when more than 50% of the mining power is occupied by the general smartphone users, the attacker needs to acquire at least as high mining power as the general miners. Referring to Equation 1 and Equation 2, the general smartphone users occupy more than 50% of the mining power under following condition of Expression 7.

$$RWD < (1+Pmin) \times \{S(\text{Phone}) + 2 \cdot S(AMC)\} \qquad \text{Equation 7}$$

Otherwise, the attack cost is derived same as in Expression6 As a result, the attack cost of the PoP blockchain platform may be derived as a conditional equation of Equation 8.

$$A(PoP) = S(AMC\_G) + S(\text{Phone}\_G) \times 0.5, \text{ if } RWD < (1+Pmin) \times \{S(\text{Phone}) + 2 \cdot S(AMC)\},$$

$$A(PoP) = \{RWD/(1+Pmin)\} \times 0.5, \text{ if } RWD \geq (1+Pmin) \times \{S(\text{Phone}) + 2 \cdot S(AMC)\} \qquad \text{Equation 8}$$

In Equation 8, A(PoP) is the attack cost in the PoP blockchain platform.

As illustrated in FIG. 11, the attack cost of the PoP blockchain platform may be compared with that of the conventional blockchain platform according to the varying reward. In FIG. 11, the horizontal axis and the vertical axis indicate the relative values of the total reward and the attack cost ACOST with respect to S(Phone_G).

In the analysis of FIG. 11, it was assumed that Pmin is 0.1 and S(AMC) is 1% of S(Phone). TRp is the attack cost A(PoP) in the PoP blockchain platform according to some example embodiments and TRc is the attack cost A(Conv) in the conventional blockchain platform.

In case of the conventional blockchain platform, the attack cost is directly proportional to the reward. Thus, when the reward is very small, the A(Conv) is also very small. For example, the integrity of the blockchain cannot be reserved when the reward is small. Alternatively, A(PoP) never falls below 56.1% of S(Phone_G), which is extremely higher than that of the conventional blockchain platform. This is due to the general miners. Unlike the dedicated miners, the general miners keep on buying smartphones regardless of the amount of blockchain rewards. Therefore, the PoP blockchain platform may guarantee high integrity even when the reward is very small. Especially, when the reward is 1.1% of S(Phone_G), A(PoP) is 110 times higher than A(PoP). The C(PoP) is same as C(Conv) at this point.

When the blockchain reward increase, A(Conv) increases. When the reward becomes 123.4% of S(Phone_G), A(Conv) becomes the same as A(PoP). After that point, both of A(Conv) and A(PoP) increase with the same gradient. This is due to the increase of the dedicated miners in PoP blockchain. On this point, the dedicated miners occupy 50% of total mining power, and the attack cost is derived same as in the conventional blockchain platform after this point.

As a result, the PoP and/or a PoD blockchain platform according to some example embodiments may provide high integrity regardless of the blockchain reward, while the conventional blockchain platform only guarantees high integrity under a very high reward.

Figure 12:
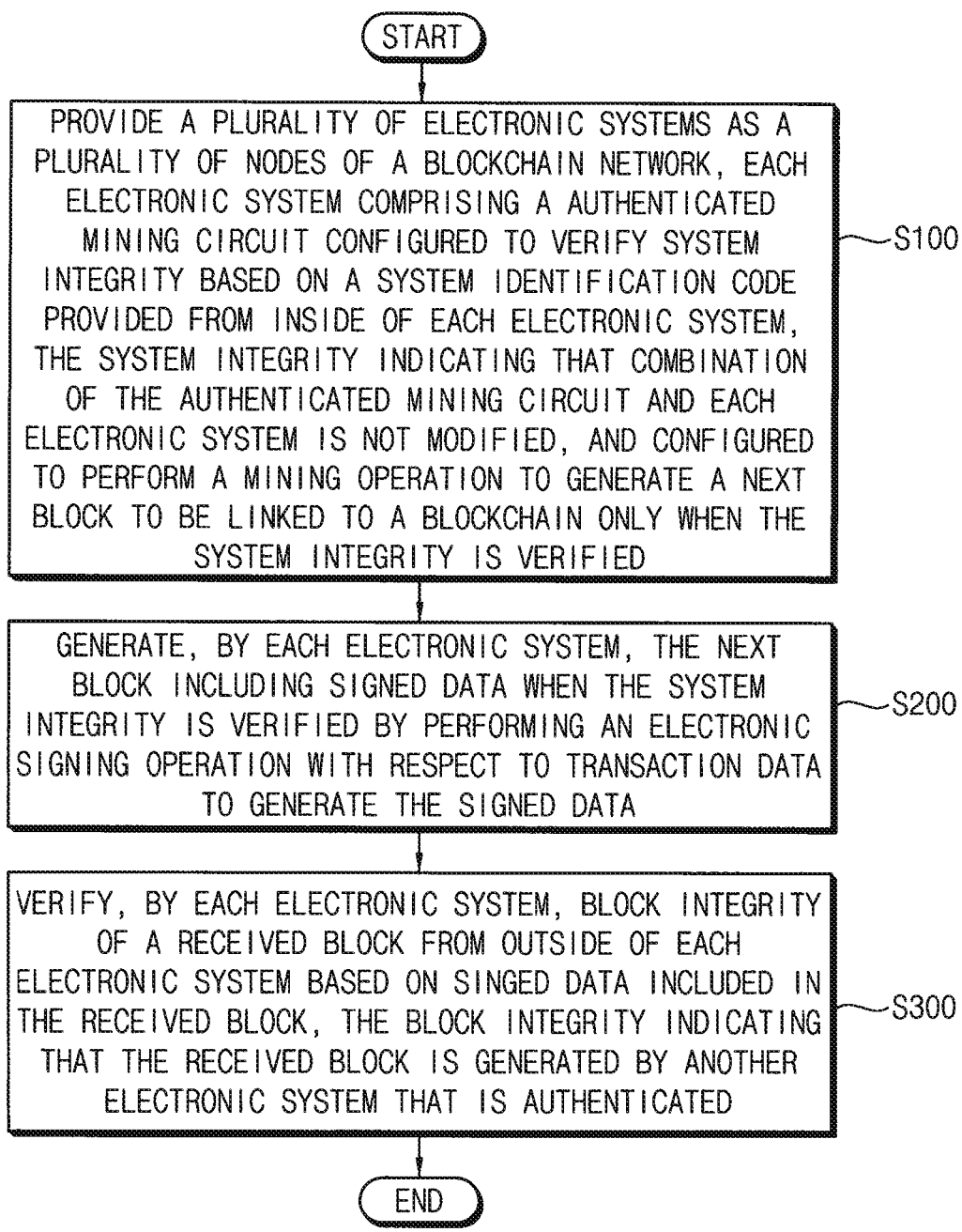
FIG. 12 is a flow chart illustrating a method of forming a PoD blockchain network according to some example embodiments.

FIG. 12 is a flow chart illustrating a method of forming a PoD blockchain network according to some example embodiments.

Referring to FIG. 12, a plurality of electronic systems including the authenticated mining circuits as described above are provided as a plurality of nodes of a blockchain network (S100). The authenticated mining circuit may verify system integrity based on a system identification code provided from inside of each electronic system, where the system integrity indicate that combination of the authenticated mining circuit and each electronic system is not modified. The authenticated mining circuit may perform a mining operation to generate a next block to be linked to a blockchain only when the system integrity is verified.

By each electronic system, the next block including signed data is generated when the system integrity is verified by performing an electronic signing operation with respect to transaction data to generate to the signed data (S200).

By each electronic system, block integrity of a received block from outside of each electronic system is verified based on signed data included in the received block (S300), where the block integrity indicate that the received block is generated by another electronic system that is authenticated.

As such, the authenticated mining circuit, the electronic system including the authenticated mining circuit, and the method of forming the blockchain network according to some example embodiments may prevent or reduce the likelihood of, indiscriminate mining competition by increasing an entry cost into the blockchain network and thus reduce a maintenance cost or an operation cost of the blockchain network while securing integrity of the blockchain network.

Inventive concepts may be applied to any electronic devices and systems for establishing a PoD blockchain network. For example, inventive concepts may be applied to systems such as a computer, a notebook, a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, and/or other systems.

The foregoing is illustrative of example embodiments and is not to be construed as limiting thereof. Although a few example embodiments have been described, those skilled in the art will readily appreciate that many modifications are possible in the example embodiments without materially departing from inventive concepts.

What is claimed is:

1. An electronic system forming a node of a network, comprising:
   a plurality of hardware devices; and
   an authenticated circuit, the authenticated circuit integrated, as fixed hardware, in the electronic system together with the plurality of hardware devices during a manufacturing process of the electronic system, the authenticated circuit configured to verify system integrity based on a system identification code provided from inside of the electronic system by at least one of the plurality of hardware devices, the system integrity indicating that a combination of the authenticated circuit and the plurality of hardware devices has not been modified since the manufacturing process, the authenticated circuit configured to perform a mining operation to generate a next block, the next block to be linked to a blockchain only in response to the authenticated circuit verifying the system integrity, wherein
   the next block includes a proof of authentication that the next block was mined by the authenticated circuit and that the combination of the authenticated circuit and the plurality of hardware devices has not been modified since the manufacturing process.

2. The electronic system of claim 1, wherein the authenticated circuit is configured to store a reference code corresponding to the system identification code, and the authenticated circuit is configured to verify the system integrity by comparing the reference code stored in the authenticated circuit and the system identification code provided from inside of the electronic system.

3. The electronic system of claim 2, wherein the electronic system provides the system identification code to the authenticated circuit during an initialization process, the initialization process being after assembly of the electronic system, and
   the authenticated circuit is configured to store the system identification code as the reference code during the initialization process.

4. The electronic system of claim 2, wherein the authenticated circuit includes a one-time programmable (OTP) memory configured to store the reference code.

5. The electronic system of claim 1, wherein the electronic system includes a mobile device.

6. The electronic system of claim 5, wherein the system identification code includes at least one of an international mobile equipment identity (IMEI) code or serial numbers of at least one of the plurality of hardware devices.

7. The electronic system of claim 1, wherein, in response to the authenticated circuit verifying the system integrity, the authenticated circuit
   generates a block authentication signature based on a private key and new transaction data, and
   generates the next block, the next block including the new transaction data and the block authentication signature.

8. The electronic system of claim 7, wherein, in response to the electronic system receiving a received block from outside of the electronic system, the electronic system is configured to verify block integrity of the received block based on a block authentication signature and transaction data included in the received block,
   wherein the block integrity indicates that another electronic system that is authenticated generated the received block.

9. The electronic system of claim 1, wherein the authenticated circuit includes:
   a data transceiver configured to perform communication with other nodes in the network and configured to store new transaction data to be included in the next block;
   a key authenticator configured to verify the system integrity and, in response to verifying the system integrity, perform an electronic signing operation with respect to the new transaction data provided from the data transceiver, the key authenticator generating signed data;

an mining accelerator configured to perform the mining operation based on the signed data to generate the next block; and a block controller configured to verify validity of the next block and the new transaction data provided through the data transceiver.

10. The electronic system of claim 9, wherein the key authenticator includes:

an OTP memory configured to store a reference code, the reference code corresponding to the system identification code; and a comparator configured to generate a system authentication signal by comparing the reference code stored in the OTP memory and the system identification code provided from inside of the electronic system, the system authentication signal indicating a verification result of the system integrity.

11. The electronic system of claim 10, wherein the electronic system provides the system identification code to the authenticated circuit during an initialization process, the initialization process performed after assembly of the electronic system, and the authenticated circuit is configured to store the system identification code in the OTP memory as the reference code during the initialization process.

12. The electronic system of claim 10, wherein the key authenticator further includes:

an encryptor configured to, perform the electronic signing operation with respect to the new transaction data to be included in the next block in response to the system authentication signal indicating that the authenticated circuit has verified the system integrity.

13. The electronic system of claim 12, wherein, in response to the authenticated circuit verifying the system integrity, the encryptor is configured to generate a block authentication signature based on a private key and the new transaction data, and generate the next block, the next block including the new transaction data and the block authentication signature.

14. The electronic system of claim 9, wherein the plurality of hardware devices include a storage device configured to store transaction records of the network, and wherein the block controller is configured to verify the validity of the new transaction data provided through the data transceiver based on the transaction records.

15. An authenticated circuit, comprising:

a data transceiver configured to perform communication with other nodes in a network and configured to store new transaction data to be included in a next block;

a key authenticator configured to verify system integrity of an electronic system based on a system identification code provided from inside of the electronic system, the system integrity indicating that combination of the authenticated circuit and the electronic system has not been modified since assembling of the electronic system, and, in response to the key authenticator verifying the system integrity, the key authenticator is configured to perform an electronic signing operation with respect to the new transaction data provided from the data transceiver to generate signed data;

a mining accelerator configured to generate the next block by perform a mining operation based on the signed data; and a block controller configured to verify validity of a block and the new transaction data provided through the data transceiver, wherein the authenticated circuit is integrated in the electronic system, and the electronic system corresponds to a node of the network, and the next block includes a proof of authentication that the next block was mined by the authenticated circuit and that the combination of the authenticated circuit and the electronic system has not been modified since the assembling of the electronic system.

16. The authenticated circuit of claim 15, wherein the key authenticator includes;

a one-time programmable (OTP) memory configured to store a reference code corresponding to the system identification code;

a comparator configured to generate a system authentication signal indicating a verification result of the system integrity by comparing the reference code stored in the OTP memory and the system identification code provided from inside of the electronic system; and an encryptor configured to perform the electronic signing operation with respect to the transaction data to be included in the next block to generate the signed data, the encryptor configured to perform the electronic signing operation in response to the system authentication signal indicating that the system integrity is verified.

17. The authenticated circuit of claim 16, wherein the key authenticator receives the system identification code during an initialization process, the initialization process being performed after assembly of the electronic system, and the authenticated circuit is configured to store the system identification code as the reference code in the OTP memory during the initialization process.

18. The authenticated circuit of claim 16, wherein, in response to the system integrity being verified, the encryptor is configured to generate a block authentication signature based on a private key and the new transaction data, and generate the next block, the next block including the new transaction data and the block authentication signature.

19. A method of forming a network, comprising:

providing a plurality of electronic systems as a plurality of nodes of the network, each of the plurality of electronic systems comprising an authenticated circuit configured to verify system integrity based on a system identification code provided from inside of each electronic system, the system integrity indicating that combination of the authenticated circuit and the corresponding electronic system has not been modified since assembly of the electronic system, and the authenticated circuit configured to perform a mining operation to generate a next block to be linked to a blockchain only in response to the authenticated circuit verifying the system integrity, the next block including a proof of authentication that the next block was mined by the authenticated circuit and that the combination of the authenticated circuit and the electronic system has not been modified since the assembling of the electronic system;

generating, by at least one of the plurality of electronic systems, the next block, the next block including signed data, by performing an electronic signing operation with respect to transaction data to generate to the signed data, the performing the electronic signing operation being in response to verification of the electronic signing operation; and verifying, by each electronic system, block integrity of a received block received from outside of each electronic system based on signed data included in the received block, the block integrity indicating that another electronic system generated the received block, the another electronic system being authenticated.

20. The method of claim 19, further comprising:

storing, by each electronic system, a reference code corresponding to the system identification code in a one-time programmable (OTP) memory included in the authenticated circuit, wherein the authenticated circuit is configured to verify the system integrity by comparing the reference code stored in the OTP memory with the system identification code provided from inside of each electronic system.

\* \* \* \* \*